(12) United States Patent
Heath et al.

(10) Patent No.: US 10,496,806 B2
(45) Date of Patent: *Dec. 3, 2019

(54) METHOD FOR SECURE OPERATION OF A COMPUTING DEVICE

(71) Applicant: NOKIA TECHNOLOGIES OY, Espoo (FI)

(72) Inventors: Craig Robin Paskett Heath, Hertfordshire (GB); Leon Clarke, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,257

(22) Filed: Oct. 8, 2018

(65) Prior Publication Data

US 2019/0073463 A1 Mar. 7, 2019

Related U.S. Application Data

(63) Continuation of application No. 15/292,493, filed on Oct. 13, 2016, now Pat. No. 10,095,852, which is a continuation of application No. 10/596,774, filed as application No. PCT/GB2004/005275 on Dec. 16, 2004, now abandoned.

(30) Foreign Application Priority Data

Dec. 23, 2003 (GB) .................................. 0329835.3

(51) Int. Cl.
*G06F 21/32* (2013.01)
*G06F 21/31* (2013.01)

(52) U.S. Cl.
CPC .............. *G06F 21/32* (2013.01); *G06F 21/31* (2013.01); *G06F 2221/2137* (2013.01); *G06F 2221/2151* (2013.01)

(58) Field of Classification Search
None
See application file for complete search history.

(56) References Cited

U.S. PATENT DOCUMENTS

| 5,913,025 | A  |   | 6/1999  | Higley et al. |
| 6,567,915 | B1 |   | 5/2003  | Guthery |
| 10,095,852 | B2 | * | 10/2018 | Heath ..................... G06F 21/31 |

(Continued)

FOREIGN PATENT DOCUMENTS

| EP | 0580350 A1   | 1/1994 |
| JP | 2002-269041 A | 9/2002 |

(Continued)

OTHER PUBLICATIONS

Search Report transmittal dated May 26, 2004 from the Patent Office, Application No. GB0329835.3, 2 pages.

(Continued)

*Primary Examiner* — Kaveh Abrishamkar
(74) *Attorney, Agent, or Firm* — Alston & Bird LLP

(57) ABSTRACT

In a computing device, when a user requests to carry out an operation, the device determines the type of operation requested and the time period since the user was last authenticated. The operation is enabled only if the determined time period does not exceed a threshold for the requested operation.

20 Claims, 1 Drawing Sheet

(56) References Cited

U.S. PATENT DOCUMENTS

| | | | |
|---|---|---|---|
| 2002/0178359 A1 | 11/2002 | Baumeister et al. | |
| 2003/0074552 A1* | 4/2003 | Olkin | H04L 51/30 713/150 |
| 2003/0191594 A1* | 10/2003 | Kondo | G06F 21/316 702/80 |
| 2004/0205176 A1* | 10/2004 | Ting | H04L 67/306 709/223 |
| 2007/0289011 A1 | 12/2007 | Heath et al. | |
| 2016/0063236 A1* | 3/2016 | Masuko | G06F 21/31 726/18 |

FOREIGN PATENT DOCUMENTS

| WO | WO 01/11450 A1 | 2/2001 |
|---|---|---|
| WO | WO 03/007570 AI | 1/2003 |

OTHER PUBLICATIONS

Office Action for European Application No. 04806089.1 dated Mar. 4, 2011.
Japanese Office Action for Japanese Patent application No. 2006-546301 dated Mar. 7, 2011.
Japanese Office Action for Japanese Patent application No. 2006-546301 dated Nov. 16, 2010; 8 pages.
Notice of Allowance for U.S. Appl. No. 15/292,493 dated May 31, 2018.
Office Action for U.S. Appl. No. 15/292,493 dated May 19, 2017.
Office Action for U.S. Appl. No. 15/292,493 dated Nov. 13, 2017.
Search Report for European Application No. 11189226.1 dated Jan. 2, 2012.
Office Action for European Application No. 11189226.1 dated Apr. 15, 2013.
Extended European Search Report for European Application No. 13157656.3 dated Jun. 13, 2013.
Office Action for European Application No. 13157656.3 dated Feb. 12, 2014.
Office Action for European Application No. 13157656.3 dated May 11, 2017.
Office Action for U.S. Appl. No. 10/596,774 dated May 22, 2009.
Office Action for U.S. Appl. No. 10/596,774 dated Nov. 21, 2013.
Office Action for U.S. Appl. No. 10/596,774 dated Nov. 13, 2008.
Patent Board Decision for U.S. Appl. No. 10/596,774 dated Aug. 15, 2016.
Office Action for U.S. Appl. No. 10/596,774 dated Jun. 5, 2013.
Examiner's Answer to Appeal Brief for U.S. Appl. No. 10/596,774 dated Apr. 27, 2010.
Examiner's Answer to Appeal Brief for U.S. Appl. No. 10/596,774 dated Jul. 15, 2014.
U.S. Appl. No. 15/292,493, filed Oct. 13, 2016, U.S. Pat. No. 10,095,852, Issued.
U.S. Appl. No. 10/596,774, filed May 25, 2007, 2007/0289011 A1, Abandoned.

* cited by examiner

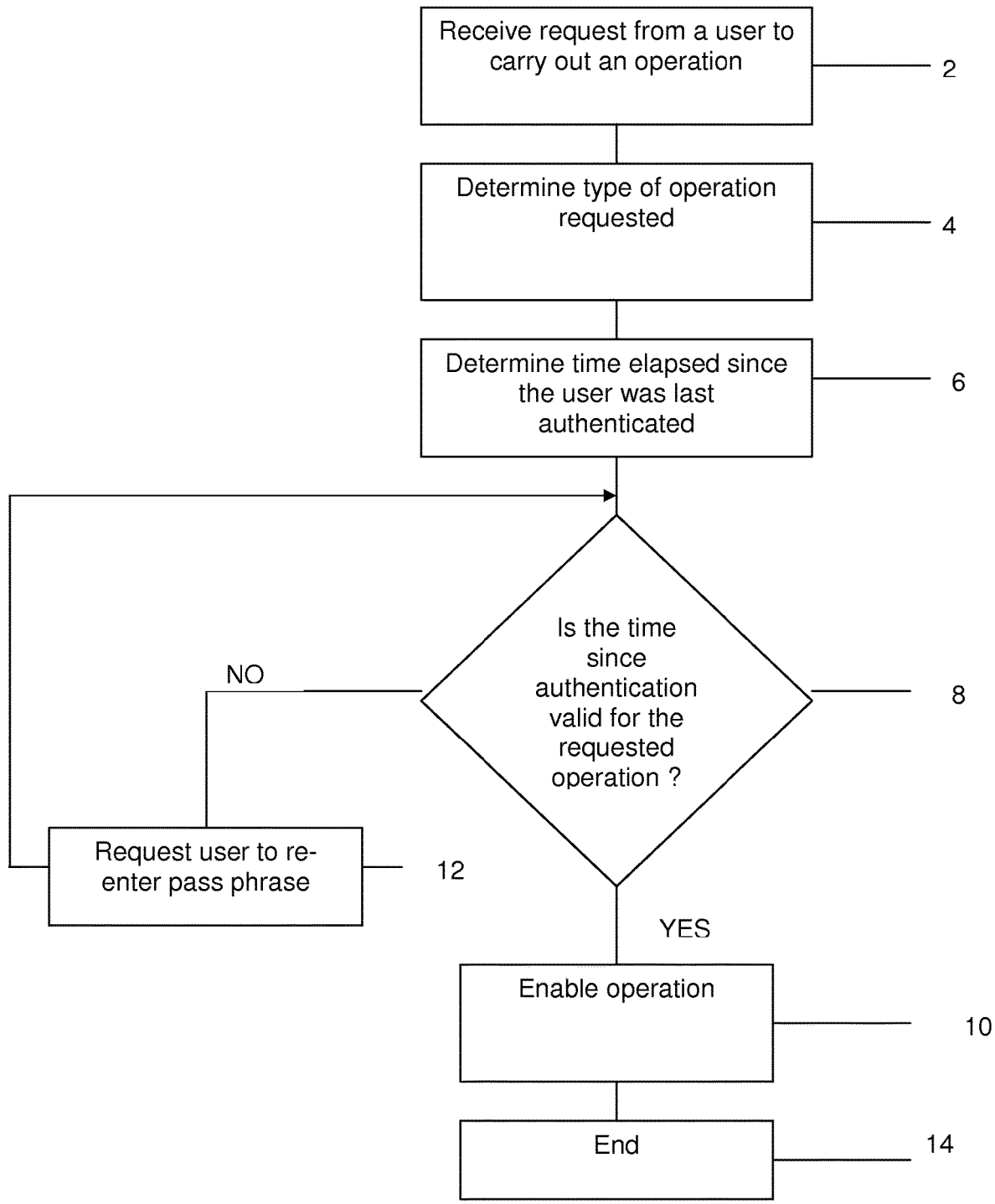

METHOD FOR SECURE OPERATION OF A COMPUTING DEVICE

CROSS-REFERENCE TO RELATED APPLICATIONS

This application is a continuation of U.S. application Ser. No. 15/292,493, filed Oct. 13, 2016, which is a continuation of U.S. application Ser. No. 10/596,774, filed May 25, 2007, which is a national phase entry of International Application No. PCT/GB2004/005275, filed Dec. 16, 2004, which claims priority to GB Application No. 0329835.3, filed Dec. 23, 2003, the entire contents of which are incorporated herein by reference.

TECHNICAL FIELD

The present invention relates to a method of operating a computing device, and in particular, to a method for secure operation of a computing device where a user needs to be authenticated, such as by entering a pass phrase, before the user is able to carry out a requested operation on the device. The present invention also relates to a computing device arranged to operate according to the above method and also to computer software for causing a computing device to operate in accordance with the above method.

The term computing device as used herein is to be expansively construed to cover any form of electrical device and includes, data recording devices, such as digital still and movie cameras of any form factor, computers of any type or form, including hand held and personal computers, and communication devices of any form factor, including mobile phones, smart phones, communicators which combine communications, image recording and/or playback, and computing functionality within a single device, and other forms of wireless and wired information devices.

BACKGROUND OF THE INVENTION

Increasingly, distributed computing systems are becoming a prevalent aspect of everyday life. Distributed computing devices are now connected by local area networks, wide area networks, and networks of networks, such as the internet. Many such networks are secured by a variety of techniques, including firewall software, routing limitations, encryption, virtual private networks, and/or other means. Computers within a security perimeter may be given ready access to data stored in the secure network, usually subject to user and group permissions, access control lists, and the like, while machines outside the perimeter are substantially or entirely denied access.

With the growth of such secure networks and their information content, there is an increasing need to support secure access by authorized users. There is also an increasing need to authenticate users because even though a user may be authorized to access a network there are certain communications over a network that are regarded to be more sensitive than others. The use of encryption and decryption techniques are increasingly being regarded as essential when carrying out any kind of sensitive transaction, such as a credit-card purchase over the internet, or the discussion of company confidential information between different remote departments in an organization.

PRIOR ART

Pretty Good Privacy (PGP) is a computer program used to encrypt and decrypt communications over large networks such as the internet. It can also be used to send an encrypted digital signature that enables a receiver of a communication to verify the identity of a sender and know that the message was not changed en route. PGP is the one of the most widely used privacy-ensuring programs. PGP uses a variation of the public key system. In such systems, each user has a publicly known encryption key and a private key known only to that user. A message sent to a third party is encrypted using the public key for that party. When the encrypted message is received by the third party, it is decrypted using the private key for that party. Since encrypting an entire message can be relatively time-consuming, PGP uses a faster encryption algorithm to encrypt the message and then uses the public key to encrypt the shorter key that was used to encrypt the entire message. Both the encrypted message and the short key are sent to the receiver who first uses the private key of the receiver to decrypt the short key and then uses that key to decrypt the message. The use of encryption/decryption techniques are considered to be especially important in wireless communications because wireless circuits are often easier to "tap" than their hard-wired counterparts.

However, it is essential to authenticate the persons sending or accessing the encrypted data. Authentication is the process of determining whether someone or something is, in fact, who or what it is declared to be. In private and public computer networks, including the internet, authentication is commonly done through the use of logon passwords. Knowledge of the password is assumed to guarantee that the user is authentic. Each user may register initially using an assigned or self-declared password. On each subsequent use, the user must know and use the previously declared password. The weakness in this system for transactions that are significant, such as the exchange of money, is that passwords can often be stolen, accidentally revealed, or forgotten.

For encryption and decryption programs such as PGP, a pass phrase is used, in essence, as a digital signature to authenticate a person. The pass phrase does, in fact, perform two purposes—it allows the key manager software to determine that the authorized user of the software is actually present (as only that user knows the PIN or pass phrase) and it confirms that the user wishes the key to be used. Hence, the pass phrase is used to prove that the person claiming to have sent a message, or trying to gain access to an encrypted message, or trying to carry out a secure transaction such as a commercial purchase, is in fact that person. Because an improved level of security is required in comparison to that provided by a normal access password, the pass phrase is typically about 16 characters in length, and frequently these may be up to about 100 characters in length.

If rogue software were to try to invoke the key manager in an attempt to sign a transaction which the user had not requested, then the appearance of the user interface requesting the user to authenticate himself/herself would alert the user that a third party is attempting to use his or her key, and the user would decline to authenticate himself/herself.

As outlined above, the pass phrase is usually a relatively lengthy sequence of alpha numeric characters and the repeated entry of the pass phrase each time user authentication is required is not considered to be convenient. If the pass phrase is a relatively lengthy alphanumeric sequence, or if pass phrase re-entry is requested too often, repeated authentication too frequently may even discourage the use of the encryption process by a user on occasions where its use would otherwise be considered particularly beneficial. Hence, to improve the user experience of the use of such systems, it is known not to require the user to authenticate again if the key is used a short time after a previous use of the key. This is referred as "pass phrase caching". Pass phrase caching is one way of implementing the user experience in a way such that the key is "unlocked" for a predetermined period of time. It is only after the expiry of this period of time that further use of the key will require the authentication process to be repeated.

With known authentication schemes, the pass phrase is cached for a predetermined time period; for example 30 minutes. Hence, the following sequence of events may, as an example, be required of a user in order to carry a number of secure Operations 1. A user requests to decrypt an email—Operation A.
2. The user enters his/her pass phrase (authenticates himself/herself) to decrypt and read the mail.
3. Five minutes later, the user decrypts another email—Operation A.
4. The user is not asked to re-enter the pass phrase because the pass phrase is still cached.
5. One minute later, the user signs another email—Operation B.
6. The user is not asked to re-enter the pass phrase because the pass phrase is still cached.
7. One minute later, the user signs another email—Operation B.
8. The user is not asked to re-enter the pass phrase because the pass phrase is still cached.
9. Five minutes later, the user signs another email—Operation B.
10. The user is not asked to re-enter the pass phrase because the pass phrase is still cached.
11. One hour later, the user tries to sign another email—Operation B.
12. The user re-enters the pass phrase because the cached pass phrase has expired.
13. One hour later, the user requests to decrypt another email—Operation A.
14. The user re-enters the pass phrase because the cached pass phrase has expired.
15. Ten minutes later, the user requests to carry out a financial transaction—Operation C.
16. The user is not asked to re-enter the pass phrase because the pass phrase is still cached.

It can be seen from the above example that, because the pass phrase is cached for a predetermined period of time, Operation A, Operation B or Operation C can be carried out for as long as the caching period for the pass phrase is valid because a common caching period is adopted irrespective of the operation to be carried out by the user. However, it will be appreciated that, in the above example, Operation C, involving financial expense, is more commercially sensitive than Operation B. Furthermore, Operation B, involving the generation of an email, is more sensitive than Operation A, which is limited to reading of an email. But, each can be carried out without re-entry of the pass phrase since the pass phrase is already authenticated because the caching period has not expired. Hence, to an extent, the caching of a pass phrase for a period which is considered appropriate for one type of operation may compromise security for another type of operation.

SUMMARY OF THE INVENTION

It is therefore an object of the present invention to provide an improved method for authenticating a user requiring to perform an operation on a computing device.

According to a first aspect of the present invention there is provided a method of operating a computing device, the method comprising, in response to a request from a user to carry out an operation using the device, determining the time period since the identity of the user was authenticated, and enabling the requested operation in dependence upon the determined time period and the purpose of the requested operation.

According to a second aspect of the present invention there is provided a computing device arranged to operate in accordance with a method according to the first aspect. According to a third aspect of the present invention there is provided computer software for causing a computing device in accordance with the second aspect to operate in accordance with a method according to the first aspect.

BRIEF DESCRIPTION OF DRAWINGS

FIG. 1 is a process flow diagram for secure operation of a computing device, according to an embodiment of the present disclosure.

An embodiment of the present invention will now be described, by way of further example only, with reference to FIG. 1, which illustrates a flow chart of a method for authenticating a user in accordance with the present invention.

Referring to FIG. 1, at step 2 a computing device receives a request to carry out a secure operation, which can only be completed if the user is currently authenticated, such as by entry of a pass phrase. At step 4, the computing device determines the type of operation which the user has requested. For example, the user may be requesting to carry out approval of a purchase contract with significant financial obligations, in which case it is imperative to correctly identify the user and thus ensure that the user has the authority to commit to the financial obligations. This can be regarded as an operation requiring a high security level. Alternatively, the user may be requesting to carry out a relatively low security level operation, such as reading of an email. The type of operation being requested may be determined in a number of ways, such as by determining the type of application used to carry out the operation, the type of file required, or even by analyzing the content of the request itself. Many ways of determining the type of operation will be apparent to persons familiar to this art, and it is considered that the present invention can be applied to and therefore encompasses any method which can be used to categorize requested operations.

At step 6, the computing device determines the time which has elapsed since the user was last authenticated by entering his/her pass phrase. With the present invention, the computing device then determines whether the time elapsed since authentication is acceptable for the operation being requested. This is shown as step 8 in FIG. 1. Taking the examples of contract approval and reading an email, as referred to above, the reading of the email is a relatively low level secure operation and hence the 'standard' caching period, say one hour, is considered to be acceptable.

The time period elapsed since the last authentication is determined to be less than one hour and the pass phrase, and thus the identity of the user, is considered to be authentic. Therefore, the operation is enabled and this is shown as step 10 in FIG. 1. However, for the contract approval operation, the system has been arranged such that for this type of operation the caching period expires upon the completion of the previous operation of the same type. Hence, in this example the computing device determines at step 8 that the time elapsed since the last authentication is not valid for the requested operation and requests, at step 12 of FIG. 1, for the user to re-enter his/her pass phrase in order to authenticate the user for the particular contract approval operation. If the pass phrase is entered correctly, the user is authenticated and the time period is determined to be acceptable at step 8 and this high level secure operation is then enabled. After enabling the requested operation, the process ends at step 14. It can be seen that the above process provides a more secure environment, but still enables one pass phrase to control the use of all keys.

The following example shows how the present invention may be used for two similar but more obviously distinct operations. Operation A is "decrypt and view my calendar entries for today", and Operation B is "sign a transaction to purchase a book". Operation A is in all probability going to be requested by the user many times during each working day and hence would be very annoying if the user has to type in his/her pass phrase every time the user wishes to consult the calendar entries for the day concerned. In essence, the user should only be required to enter his/her pass phrase once or possibly twice a day to carry out this operation. On the other hand, Operation B is costing money, so the user will want to make ensure that a third party who may gain access to the computing device, which may be in the form of a mobile phone, cannot carry out any financial transaction, such as the purchase of books, so a relatively short caching time is set for this type of operation. But, suppose the user wishes to purchase three books from three suppliers in relatively quick succession, then the user does not want to have to enter his/her pass phrase for each transaction, but nevertheless requires to have a higher level of security than that provided by the caching time set for his/her calendar. In fact the user may want his/her pass phrase to permit use of Operation B for a relatively short time, say 3 minutes. So, in the present invention, the above operations may be conducted as follows:

1. The user asks to view his/her calendar—Operation A.
2. The user enters his/her pass phrase.
3. Five minutes later, the user views another day in the calendar—Operation A.
4. Because the pass phrase was entered less than one day ago and is within the caching period, the user is not prompted for his/her pass phrase.
5. One minute later, the user requests to buy a book—Operation B.
6. Because the pass phrase was last entered more than 3 minutes ago, the user IS asked to re-enter the pass phrase. This is different behavior and is good security.
7. One minute later the user buys another book—Operation B.
8. The user is not asked to re-enter the pass phrase because the pass phrase was last entered less than 3 minutes ago.
9. Five minutes later the user buys another book—Operation B.
10. The user IS asked to re-enter the pass phrase because it was last entered more than 3 minutes ago—different behavior for Operation B, with improved security with use of the same password.
11. One hour later the user buys another book—Operation B.
12. The user is requested to re-enter the pass phrase.
13. One hour later the user requests to view calendar entries—Operation A.
14. The user IS NOT requested to re-enter the pass phrase because it was last entered less than one day ago)—different behavior to Operation B, providing a requisite level of security with good user convenience.

In summary, the user is asked for his/her pass phrase only when it considered necessary according to the security of the operation that is about to be carried out and the time that has elapsed since the pass phrase was last entered, and not mechanically upon a time period fixed for a caching period which does not relate to the operations which may be carried out during the caching period. It is envisaged that the user will select the categories of operations, and the associated elapsed time periods so that the user may arrange never to have to re-enter the pass phrase in rapid succession.

Although the present invention has been described with reference to a particular embodiment, it will be appreciated that modifications may be effected whilst remaining within the scope of the present invention as defined by the appended claims. For example, in the embodiment described above, the elapsed time is determined from the last or immediately preceding entry of the pass phrase. However, this elapsed time may also be determined from a previous entry of the pass phrase which is not necessarily the last entry. Furthermore, the invention has been described with reference to the use of pass phrases. However, other methods for authenticating the user may also be employed, such as the use of pass words or PINs (Personal Identification Numbers), and/or biometric data, such as fingerprint or iris recognition.

That which is claimed:

1. A method comprising:
   causing, in response to a first request from a user to carry out a first operation on a local computing device, presentation of a first request for the user to submit authentication indicia indicative of the user's identity;
   enabling the first operation in response to receipt of the authentication indicia;
   determining, in response to receipt of a second request from the user to carry out a second operation on the local computing device, an elapsed time after enabling the first operation, an operation type of the second operation from among a plurality of operation types associated with a plurality of security time periods; and
   either
   in an instance when the elapsed time is greater than the security time period associated with the second operation type, causing presentation of a second request for the user to submit the authentication indicia and, upon receipt of the authentication indicia from the user, enabling the second operation; or
   in an instance when the elapsed time is not greater than the security time period associated with the second operation type, enabling the second operation.

2. The method of claim 1, wherein the authentication indicia comprises at least one of a pass phrase, biometric information, a user's fingerprint, a user's iris, a personal identification number, a password, or a digital signature.

3. The method of claim 1, wherein at least one of the plurality of security time periods are set by the user.

4. The method of claim 3, wherein all of the plurality of security time periods are set by the user.

5. The method of claim 1, wherein, for at least one type of operation, the security time period expires upon completion of an immediately preceding operation of the same type.

6. The method of claim 1, wherein, for at least a first type of operation, the security time period expires upon receiving a request for a second type of operation.

7. The method of claim 1, wherein the local computing device comprises a mobile phone.

8. The method of claim 1, wherein the local computing device comprises a personal computer.

9. An apparatus comprising at least one processor and at least one memory including computer program code, the at least one memory and the computer program code configured to, with the at least one processor, cause the apparatus to perform:

causing, in response to a first request from a user to carry out a first operation on the apparatus, presentation of a first request for the user to submit authentication indicia indicative of the user's identity;

enabling the first operation in response to receipt of the authentication indicia;

determining, in response to receipt of a second request from the user to carry out a second operation on the apparatus, an elapsed time after enabling the first operation, an operation type of the second operation from among a plurality of operation types associated with a plurality of security time periods; and either in an instance when the elapsed time is greater than the security time period associated with the second operation type, causing presentation of a second request for the user to submit the authentication indicia and, upon receipt of the authentication indicia from the user, enabling the second operation; or in an instance when the elapsed time is not greater than the security time period associated with the second operation type, enabling the second operation.

10. The apparatus of claim 9, wherein authentication indicia comprises at least one of a pass phrase, biometric information, a user's fingerprint, a user's iris, a personal identification number, a password, or a digital signature.

11. The apparatus of claim 9, wherein at least one of the plurality of security time periods are set by the user.

12. The apparatus of claim 11, wherein all of the plurality of security time periods are set by the user.

13. The apparatus of claim 9, wherein, for at least one type of operation, the security time period expires upon completion of an immediately preceding operation of the same type.

14. The apparatus of claim 9, wherein, for at least a first type of operation, the security time period expires upon receiving a request for a second type of operation.

15. The apparatus of claim 9, wherein the apparatus comprises a mobile phone.

16. The apparatus of claim 9, wherein the apparatus comprises a personal computer.

17. A computer-readable medium comprising instructions for causing an apparatus to perform at least the following:

causing, in response to a first request from a user to carry out a first operation on the apparatus, presentation of a first request for the user to submit authentication indicia indicative of the user's identity;

enabling the first operation in response to receipt of the authentication indicia;

determining, in response to receipt of a second request from the user to carry out a second operation on the apparatus, an elapsed time after enabling the first operation, an operation type of the second operation from among a plurality of operation types associated with a plurality of security time periods; and either in an instance when the elapsed time is greater than the security time period associated with the second operation type, causing presentation of a second request for the user to submit the authentication indicia and, upon receipt of the authentication indicia from the user, enabling the second operation; or in an instance when the elapsed time is not greater than the security time period associated with the second operation type, enabling the second operation.

18. The computer-readable medium of claim 17, wherein the authentication indicia comprises at least one of a pass phrase, biometric information, a user's fingerprint, a user's iris, a personal identification number, a password, or a digital signature.

19. The computer-readable medium of claim 17, wherein at least one of the plurality of security time periods are set by the user.

20. The computer-readable medium of claim 17, wherein, for at least one type of operation, the security time period expires upon completion of an immediately preceding operation of the same type.

* * * * *